E. J. A. SCHULTZ.
ENGINE VALVE.
APPLICATION FILED SEPT. 24, 1918.

1,297,407.

Patented Mar. 18, 1919.

Inventor:
Emile Joseph Augustin Schultz
By Attorneys,
Fraser, Dunk & Myers

UNITED STATES PATENT OFFICE.

EMILE JOSEPH AUGUSTIN SCHULTZ, OF PARIS, FRANCE.

ENGINE-VALVE.

1,297,407.  Specification of Letters Patent.  Patented Mar. 18, 1919.

Application filed September 24, 1918. Serial No. 255,515.

*To all whom it may concern:*

Be it known that I, EMILE JOSEPH AUGUSTIN SCHULTZ, a citizen of the Republic of France, residing in Paris, France, have invented certain new and useful Improvements in Engine-Valves, of which the following is a specification.

This invention relates to valves for internal combustion engines of the rotary cylinder type.

It has already been proposed to construct the cylinder of a four-stroke cycle internal combustion engine with ports which are uncovered by the piston at the end of the expansion and admission strokes, with the object of improving the operation of the engine by securing, in addition to the ordinary distribution, a free exhaust at the end of the expansion and a supplementary intake of pure air at the end of the admission. The opening of these ports at the end of the admission stroke is only advantageous when the engine turns at a certain speed.

By the present invention there is provided in an engine of the rotary cylinder type an automatic valve for controlling the action of such cylinder ports according to the speed of the engine, whereby the flexibility of the latter is maintained.

The accompanying drawings illustrate the invention.

Figure 1:
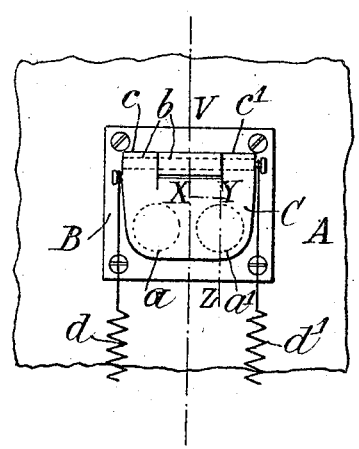
Figure 2:
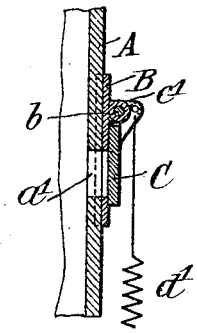
Figure 3:
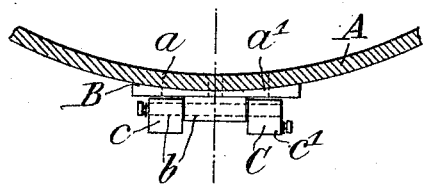

Figure 1 shows the valve in front elevation. Fig. 2 is a vertical section on the line V—X—Y—Z of Fig. 1. Fig. 3 is a horizontal section.

In this example, the valve is common to two of the aforesaid ports in the cylinder wall, but it is evident that it could cover more or even one only.

According to the invention the two ports $a$, $a'$, at suitable position in the wall of the cylinder A, to be uncovered by the piston toward the end of its stroke, are covered by a valve constructed as follows:—

A plate of bronze B conforming with the curvature of the cylinder and having two openings registering with the ports $a$ $a'$ is fixed on the cylinder.

A valve of thin steel C, mounted on a hinge formed by a pin $b$ carried by the plate B, closes normally the two ports $a$, $a'$. Claws $c$, $c'$ formed at the upper part of the valve limit the opening of the latter to an angle of 90°. Two springs $d$, $d'$ keep the valve on its seat. These springs are for compensating the effect of centrifugal force on the valve when the speed, for example 500 turns per minute, is sufficiently below the normal speed.

The points of attachment of the springs to the valve are suitably arranged so that the action of the springs may be substantially constant in all positions of the valve.

The operation of the valve is as follows:—

When the engine slackens speed the valve opens only under the pressure of the gases contained in the cylinder at the end of the expansion, before the exhaust valve is opened. The opening of the latter valve is thus greatly facilitated since the pressure within the cylinder is reduced substantially to that of the atmosphere. Moreover, the temperature of the cylinder is notably diminished in consequence of the expansion of the burnt gases.

In normal running, the speed exceeding 500 to 600 turns per minute, the valve opens under the pressure of the gases within and, urged by centrifugal force which overcomes the action of the springs $d$, $d'$, does not again close. The ports $a$, $a'$ then fulfil the double object, namely, free exhaust at the end of the expansion as previously, and an intake of supplementary pure air at the end of the admission, the fresh gases which have just been admitted into the cylinder remaining, by reason of the rapidity of the movement of the piston, at a pressure below atmospheric pressure during the whole time that the ports are open.

Having thus fully described the nature of my invention and the best means I know of carrying the same into practical effect, I claim:—

1. In a rotary cylinder internal combustion engine, the cylinder having a port in its wall in position to be uncovered by the piston toward the end of its stroke, a valve adapted to close the port, and means adapted to oppose the action of centrifugal force on the valve until a certain speed is attained by the engine.

2. In a rotary cylinder internal combustion engine, the cylinder having a port in its wall in position to be uncovered by the piston toward the end of its stroke, a hinged valve adapted to close the port, and a spring
5 adapted to oppose the action of centrifugal force on the valve until a certain speed is attained by the engine.

In witness whereof I have hereunto signed my name in the presence of two subscribing witnesses.

EMILE JOSEPH AUGUSTIN SCHULTZ.

Witnesses:
JOHN F. SIMONS,
HENRI CARTIER.